UNITED STATES PATENT OFFICE.

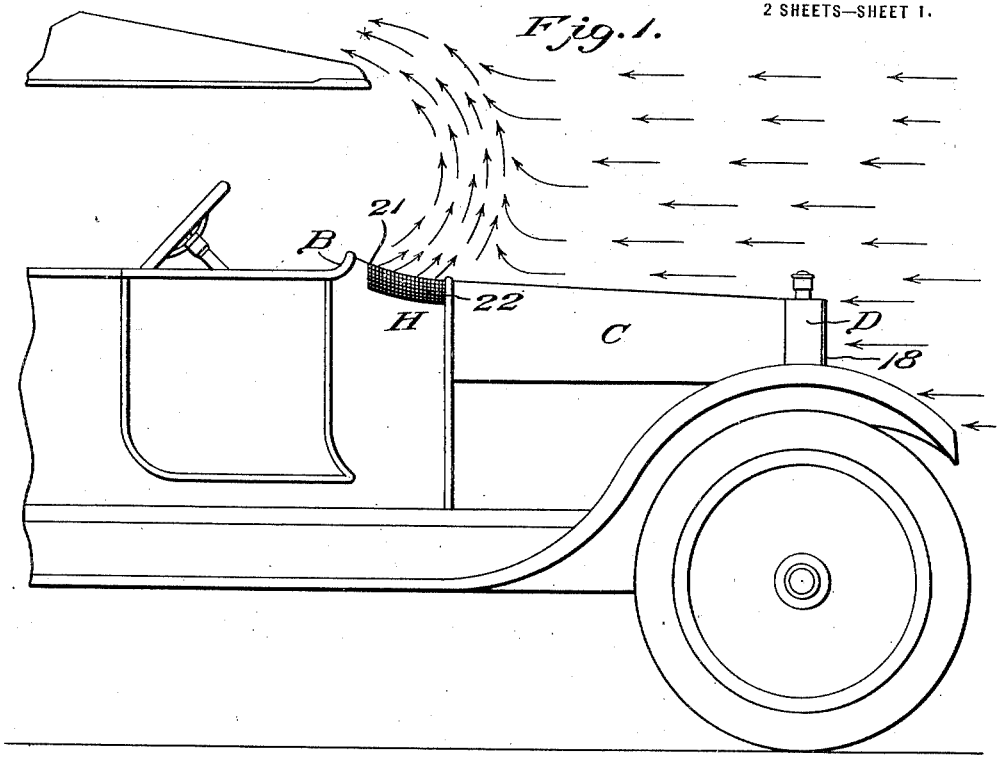
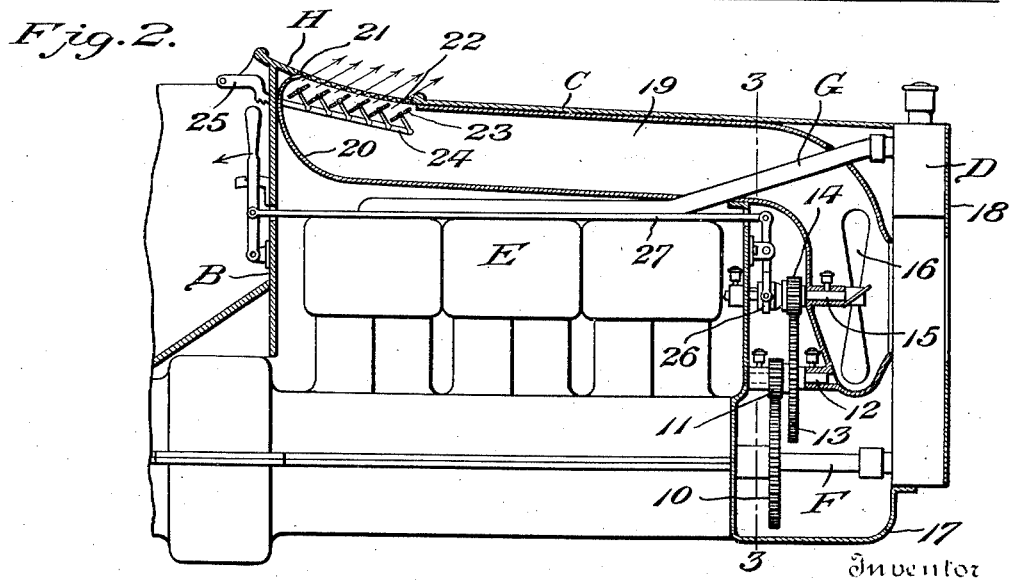

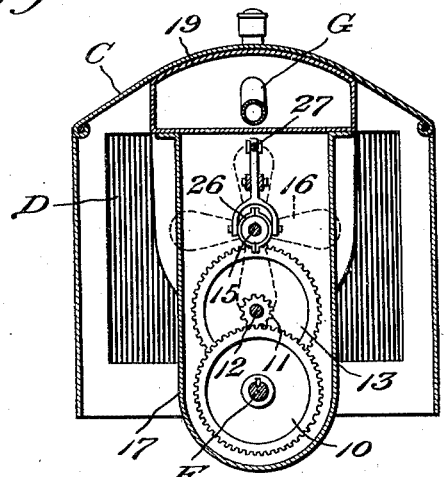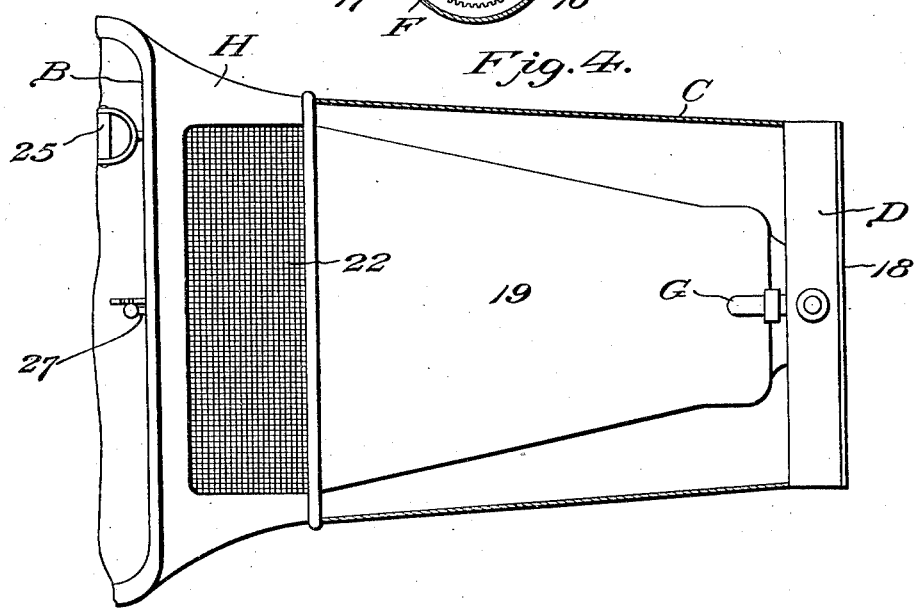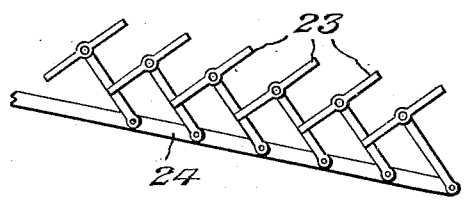

HOWARD F. SMITH, OF MEDICINE HAT, ALBERTA, CANADA.

WIND-DEFLECTOR FOR AUTOMOBILES.

1,334,811.  Specification of Letters Patent.  Patented Mar. 23, 1920.

Application filed May 26, 1919. Serial No. 299,839.

*To all whom it may concern:*

Be it known that I, HOWARD F. SMITH, residing at Medicine Hat, in the Province of Alberta and Dominion of Canada, have invented new and useful Improvements in Wind-Deflectors for Automobiles, of which the following is a specification.

This invention relates to motor vehicles and has for its object the provision of means whereby a blast of air may be generated and discharged in advance of the dash of the vehicle in such a direction as to counteract or rather direct upwardly the current of air caused by the travel of the machine, whereby the use of a wind shield with its attendant disadvantages, will be avoided.

An important object is the provision of a device of this character which is built into and forms a part of an automobile and which is so arranged that the generation of the blast may be discontinued at the will of the operator, as for instance when driving at a slow speed, and in which means is provided for varying the angle of discharge of the blast whereby to conform to the different speeds of the vehicle.

Another object is the provision of a device of this character which will be simple and comparatively inexpensive in installation, which is not likely to get out of order, which may be readily adapted for use upon automobiles of various types and makes, which will be efficient in service, durable in use, and a general improvement in the art.

With the above and other objects and advantages in view, the invention consists in the details of construction to be hereinafter more fully described and claimed, and illustrated in the accompanying drawings, in which—

Figure 1 is a diagrammatic side elevation of the front portion of an automobile illustrating the air current generated and discharged by my apparatus, Fig. 2 is a longitudinal sectional view through the forward portion of the automobile, Fig. 3 is a cross sectional view on the line 3—3 of Fig. 2, Fig. 4 is a plan view of the front portion, the hood being removed, and Fig. 5 is a detail view of the adjustable slats.

Referring more particularly to the drawings, the letter A designates the front portion of an automobile having the usual dash B, hood C, radiator D, and engine E from which extends the crank shaft F, and G designates the water supply pipe leading from the upper portion of the radiator of the engine.

In carrying out my invention I provide a gear 10 which is secured upon the projecting portion of the crank shaft F and which meshes with a pinion 11 secured upon a shaft 12 suitably journaled at the front end of the engine and upon this shaft 12 is secured a gear 13 meshing with a pinion 14 secured upon a fan shaft 15 also journaled at the front of the engine and carrying a fan 16. The fan is located immediately behind the central portion of the radiator D in the usual manner. It is understood of course that proper grease cups or oil cups are provided at the different bearings, this detail forming no part of the present invention. Any suitable housing 17 may be provided for inclosing the various gears in order to protect them from dirt and dust. It will be observed that by virtue of the train of gears the fan will be rotated at an extremely high rate of speed and consequently a powerful suction will be produced through the radiator which will cool the same in the proper manner. If found advisable, the front of the radiator may be partially covered by a shield 18 in order that excessive cooling, especially in cold weather, may be avoided.

Disposed beneath the hood C and over the top of the engine E is a conduit 19 formed preferably of sheet metal and extending over the upper portion of the casing 17. The forward extremity of the lower portion of the conduit 19 is curved downwardly below the fan 16 and then upwardly and terminates at the rear wall of the radiator D. The forward end of the upper portion of the conduit 19 extends downwardly over the fan 16 and terminates also at the rear wall of the radiator. This peculiar formation of the front end of the conduit provides a chamber in which the fan rotates. It will be observed that the space between the upper and lower edges of the front end of the conduit is about the same as the opening in the radiator shield 18 so that a strong draft will be produced through only the central portion of the radiator.

At its rear end, the lower wall of the conduit 19 is curved upwardly and forwardly, as shown at 20, and the conduit at its rear end, discharges through an opening 21 formed in the cowl H of the automobile. This opening is preferably covered by a wire gauze 22 and disposed within this opening is a plurality of transversely arranged slats 23 which may be pivoted and to which is connected a rod 24 leading backwardly through the dash B and provided with a hand hold 25 whereby the slats may be moved to partially obstruct the draft through the conduit or for another reason to be hereinafter described.

In order that the fan 16 may be entirely idle when desired, I provide a clutch arrangement 26 upon the fan shaft 14 whereby the fan may be allowed to run idle and this clutch arrangement has connected therewith a rod 27 leading rearwardly beneath the hood and extending through the dash B where it is provided with a handle by means of which the rod may be moved.

In the operation of the device, when the rod 27 is so adjusted that the clutch arrangement 26 will be in gear, the fan 16 will be rotated at a very high rate of speed, thereby causing a strong draft to be drawn through the radiator and forced rearwardly through the conduit 19. As this blast of air passes through the conduit 19 and strikes against the curved rear wall 20 thereof it will be directed upwardly and forwardly between the slats 23 and out through the opening 21 in the cowl. The provision of the gauze 22 prevents dust and dirt being forced out with the blast. As this blast of air leaves the opening 21 in a forwardly and upwardly inclined direction, as shown by the arrows in Fig. 1, it will meet the onrushing wind or current of air caused by the travel of the machine. This onrushing current of air is shown by arrows in Fig. 1. As these two currents of air meet they will be, to a certain extent, neutralized or if not neutralized, the onrushing current of air will at least be deflected upwardly and will take the path shown by the arrows in Fig. 1 and will pass over the automobile at a point sufficiently high to avoid blowing upon the driver and other occupants. In this way it will be seen that the occupants will be protected from the annoyance caused by the wind, without the necessity of the employment of a wind shield with its attendant disadvantages.

It will be observed that by means of the rod 24 the slats 23 may be so adjusted as to vary the direction at which the air is discharged from the opening 21, this adjustment being important as it enables the operator to deflect the onrushing current of air whether it approaches at greater or less speed. It is also understood that the faster the car is driven the greater will be the draft produced through the conduit 19 and discharged through the opening 21.

In case, for any reason, it is desired not to deflect the onrushing current of air, it is merely necessary that the operator actuate the rod 27 and disconnect the clutch arrangement 26, whereupon the fan 16 will be idle and no blast will be produced through the conduit 19.

From the foregoing description and a study of the drawings, it will be apparent that I have thus provided a comparatively simple and inexpensive device whereby an onrushing current of air may be deflected so that it will pass over the occupants of an automobile so that the use of a wind shield with its disadvantages of clouding and the like, will be avoided. It will be understood that the various details of construction, such as material, size, and shape of the various parts will be left to the discretion of the manufacturer, as it is obvious that certain alterations would have to be made in the design in order that the device might be adapted for use upon automobiles of different types and different makes. It will also be understood that I reserve the right to make such changes as will not depart from the spirit of the invention or the scope of the subjoined claims.

Having thus described my invention, I claim:—

1. In combination with the engine of a motor vehicle, a fan journaled at the front portion of the engine and driven by a train of gears from the crank shaft of the engine, a conduit disposed beneath the hood of the automobile and having one end formed to extend partially around said fan to provide a fan chamber, said forward end of said conduit being open and terminating rearwardly of the radiator of the automobile, and the rear end of said conduit being upwardly and forwardly curved and communicating with an opening formed in the cowl of the automobile whereby when the engine is running a draft of air will be produced within said fan chamber, forced along said conduit and discharged through the opening in said cowl in a forwardly and upwardly inclined direction for deflecting the onrushing current of air caused by the travel of the automobile.

2. In combination with the engine of a motor vehicle, a fan journaled at the front portion of the engine and driven by a train of gears from the crank shaft of the engine, a conduit disposed beneath the hood of the automobile and having one end formed to extend partially around said fan to provide a fan chamber, said forward end of said conduit being open and terminating rearwardly of the radiator of the automobile, and the rear end of said conduit being upwardly and forwardly curved and communicating with an opening formed in the cowl of the automobile whereby when the engine is running a draft of air will be produced within said fan chamber, forced along said conduit and discharged through the opening in said cowl in a forwardly and upwardly inclined direction for deflecting the onrushing current of air caused by the travel of the automobile, and a plurality of slats pivoted within the opening in said cowl and movable whereby the angular inclination of the discharged air may be varied.

3. In an automobile, a fan disposed immediately behind the radiator and driven at a high rate of speed from the crank shaft of the engine, a conduit disposed beneath the hood and having its forward end formed as a casing surrounding said fan to provide a fan chamber, the forward end of said casing portion being provided with an opening coaxially of said fan, and the lower wall of the rear end of said conduit being forwardly and upwardly curved, and said rear end of said conduit communicating with a discharge opening in the cowl of the automobile, and means for disconnecting said fan from operative engagement with the crank shaft of the engine.

4. In an automobile having its cowl provided with an opening, a conduit disposed beneath the hood and communicating at one end with said opening and having its other end disposed in the rear of the radiator of the automobile, and means for producing a blast of air within said conduit whereby said blast will be discharged through said opening to have a deflecting influence upon the onrushing current of air caused by the travel of the automobile.

In testimony whereof I affix my signature.

HOWARD F. SMITH.